United States Patent [19]

Maruyama et al.

[11] Patent Number: 4,838,629
[45] Date of Patent: Jun. 13, 1989

[54] REFLECTOR

[75] Inventors: Tatsuo Maruyama; Nobuo Matsushita, both of Yokohama, Japan

[73] Assignee: Toshiba Electric Equipment Corporation, Tokyo, Japan

[21] Appl. No.: 174,954

[22] Filed: Mar. 29, 1988

[30] Foreign Application Priority Data

Mar. 30, 1987 [JP] Japan ................................. 62-76837
Sep. 30, 1987 [JP] Japan ................................ 62-246644

[51] Int. Cl.4 ............................................. G02B 5/28
[52] U.S. Cl. ...................................... 350/1.6; 350/1.1
[58] Field of Search .................................. 350/1.6, 1.1

[56] References Cited

U.S. PATENT DOCUMENTS 2,914,989 12/1959 Gretener ............................... 88/105
3,099,403 7/1963 Strawick ............................... 240/47
3,944,320 3/1976 McLintic ................................ 350/1

FOREIGN PATENT DOCUMENTS 29-13060 10/1954 Japan .
47-23102 7/1972 Japan .
56-114210 9/1981 Japan .
60-62707 5/1985 Japan .
61-58922 12/1986 Japan .

Primary Examiner—Bruce Y. Arnold
Attorney, Agent, or Firm—Cushman, Darby & Cushman

[57] ABSTRACT

A reflector for use in combination with an illumination apparatus comprises a body and a reflection film deposited on one surface of the body. The reflection film is designed to allow passage of infrared rays and to reflect visible light. The body is made of a polyimide-based resin and a polyether ketone-based resin.

2 Claims, 6 Drawing Sheets

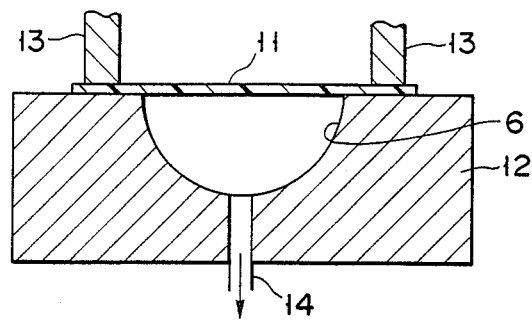
F I G. 4
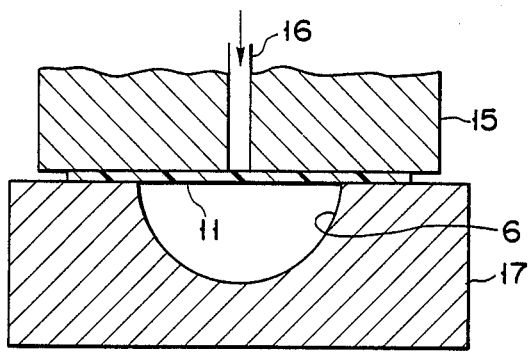
F I G. 5
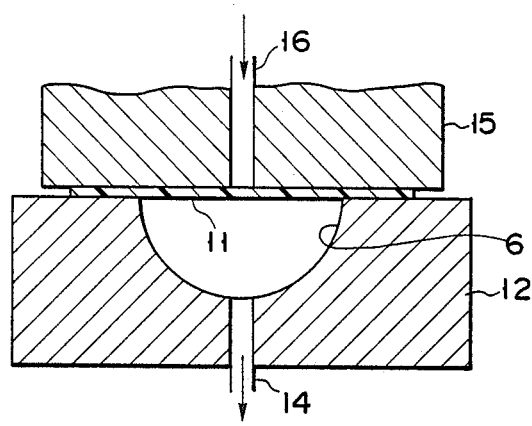
F I G. 6

REFLECTOR

BACKGROUND OF THE INVENTION

1. Field of the Invention

The present invention relates to a reflector for illumination apparatus and, more particularly, to an improvement of a reflector comprising a multilayered optical film for allowing infrared rays to pass therethrough and reflecting only visible light.

2. Description of the Related Art

An illumination apparatus comprising a reflection film for allowing infrared rays to pass therethrough and reflecting only visible light is known. The reflection film can allow infrared rays included in light emitted from a light source such as a filament, a discharging lamp, or the like to pass therethrough and to be radiated backward, and reflects only visible light forward. Thus, no infrared rays are projected onto an object to be illuminated, and a temperature rise of the object can be prevented.

An example of the reflection film having wavelength selectivity is a multilayered optical film. The film is prepared by stacking two or more types of thin layers of materials having different refractive indeces. The thicknesses of these layers are adjusted to strongly reflect only light components of an arbitrary wavelength. More specifically, several layers to tens of layers of these types, each having a thickness of $\frac{1}{4}$ (where is the wavelength of the light which the film will reflect), are stacked one upon another, thus forming the reflection film. Due to the light interference among these layers, those components of the light which have specific wavelengths are strongly reflected, whereas the other components of the light pass through the layers. That is, layers of two or three types are stacked, one upon another. The layers can have a thickness of $\frac{1}{8}$ in order to reduce the variance of degree in which the light components having wavelengths falling within the infrared range are reflected by the reflection film. Such a multilayered optical film is used to reflect only light components in the wavelength range of visible light, and to allow light components of other wavelengths, e.g., infrared rays to pass therethrough. As a result, no infrared rays are radiated on an object to be illuminated, and a temperature rise of the object can be prevented.

In an illumination apparatus comprising the multilayered optical film, a reflector body on which the film is deposited must be formed of a material having a high infrared transmission property. In a conventional illumination apparatus, the reflector is formed of a glass material. However, when the reflector is formed of the glass material, the manufacture of the reflector is cumbersome, and hence, cost is increased. In addition, the total weight is increased, and the reflector is easy to damage.

In order to eliminate such drawbacks, a reflector may be formed of a synthetic resin material. For example, in Japanese Utility Model Publication No. 47-23102, a reflector is formed of a synthetic resin film. In this utility model, the reflector is prepared such that a thermosetting synthetic resin film on which an aluminum reflection film is deposited is molded into a predetermined shape.

However, when the reflector is formed of the synthetic resin material, various problems, e.g., a problem of heat resistance, occur. More specifically, synthetic resin materials have low heat resistance, and a relatively low infrared transmittance. Therefore, when the reflector is formed of the synthetic resin material, some components of infrared rays transmitted through a multilayered optical film are absorbed in the synthetic resin material of the reflector, the temperature of the synthetic resin material is increased and may exceed the critical temperature of the heat resistance. Therefore, a reflector formed of a synthetic resin material can only be applied to an illumination apparatus which comprises a low-output light source such as a fluorescent lamp, as disclosed in Japanese Utility Model Publication No. 47-23102. The reflector disclosed in this publication has a reflection film made of aluminum, and inevitably reflects not only visible light rays but also infrared rays.

SUMMARY OF THE INVENTION

It is therefore an object of the present invention to provide an illumination apparatus free from the above drawbacks, and having a reflector formed of a synthetic resin material. The present invention can be applied to an illumination apparatus having a high-power light source.

The object of the present invention can be achieved by selecting a proper type of synthetic resin material used for a reflector. A reflector body of the illumination apparatus of the present invention is formed of a polyimide-based resin or a polyether ketone-based resin. A multilayered optical film serving as a reflection film having wavelength selectivity is formed on the body. These synthetic resin materials have a high transmittance of light components in an infrared wavelength range. Therefore, infrared rays are not absorbed, and the material itself dissipates a small amount of heat. Furthermore, these synthetic resin materials have high heat resistance.

Furthermore, the object of the present invention can be achieved by limiting the thickness of the reflector. The thickness of the reflector body of the present invention is set to fall within the range of 50 $\mu$m to 300 $\mu$m. More specifically, if the reflector has a thickness of 300 $\mu$m or less, the infrared absorbance is limited to a lower range, and a temperature by heating of the synthetic resin materials does not exceed the heat-resistant temperature of the materials. If the thickness of the reflector has a thickness of 50 $\mu$m or more, the mechanical strength and stiffness of the reflector can be sufficient. Thus, the shape of the reflection surface can be maintained at precision high enough to maintain optical characteristics. The synthetic resin materials have a high smoothness level of the surfaces upon being molded, and can provide a high-precision reflection surface. When the reflector body is thicker than 300 $\mu$m, more material must be unnecessarily used, which results in an increases of the cost of the reflector. In this case, a long time will be required to heat-process the reflector body if the body is made of a greatly heat-resistant resin, whereby the manufacture efficiency is lowered to raise the cost ultimately.

In a preferred embodiment of the present invention, the reflector is manufactured by fabricating a film or sheet of the synthetic resin material into a predetermined shape. A rib portion is formed on the reflector for the purpose of reinforcement.

BRIEF DESCRIPTION OF THE DRAWINGS

FIG. 4 is a schematic view showing another method of manufacturing the reflector;

FIG. 5 is a schematic view showing still another method of manufacturing the reflector;

FIG. 6 is a schematic view showing still another method of manufacturing the reflector;

DETAILED DESCRIPTION OF THE EMBODIMENTS

Figure 1:
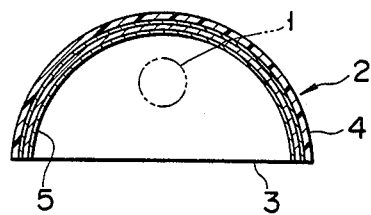
FIG. 1 is a sectional view showing a schematic structure of an illumination apparatus according to a first embodiment of the present invention.
Figure 2:
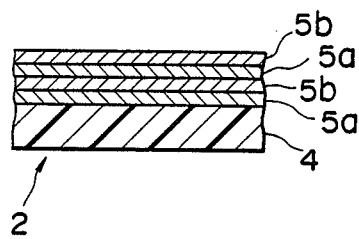
FIG. 2 is a partially enlarged sectional view of a reflector of the illumination apparatus shown in FIG. 1.

FIGS. 1 and 2 show an illumination apparatus according to a first embodiment of the present invention. The illumination apparatus is a projector. This illumination apparatus comprises light source 1 such as a halogen lamp, and reflector 2 for reflecting light emitted from the light source. Of light components emitted from light source 1, only visible light is reflected by reflector 2, and infrared rays are transmitted through reflector 2 and radiated backward. Thus, only the visible light is radiated forward from opening 3 of reflector 2. Therefore, a temperature rise of an object to be illuminated can be prevented.

Reflector 2 comprises body 4 of a synthetic resin material and multilayered optical film 5 deposited on the inner surface of body 4. Reflector body 4 is formed of a polyimide-based resin or a polyether ketone-based resin. The thickness of reflector body 4 is set to fall within the range of 50 $\mu$m to 300 $\mu$m. Multilayered optical film 5 is prepared by alternately depositing a plurality of high-refractive index films 5a of a material having a high refractive index, and a plurality of low-refractive index films 5b of a material having a low refractive index, as shown in FIG. 2. The thicknesses of these films are appropriately set to correspond to light components to be reflected, i.e., a wavelength range of visible light. Visible light is interfered in these films and strongly reflected. Infrared rays are transmitted through multilayered optical film 5, and then transmitted through reflector body 4 and radiated backward. In multilayered optical film 5, high-refractive index film 5a can employ a titanium oxide ($TiO_2$) film and low-refractive index film 5b can employ a silicon oxide ($SiO_2$) film, or film 5a may employ a zinc sulfate (ZnS) film and film 5b may employ a magnesium fluoride ($MgF_2$) film. Several films to tens of films of these types, generally 15 to 23 films, are normally stacked. In FIG. 2, however, only four layers are illustrated for the sake of simplicity.

Figure 13:
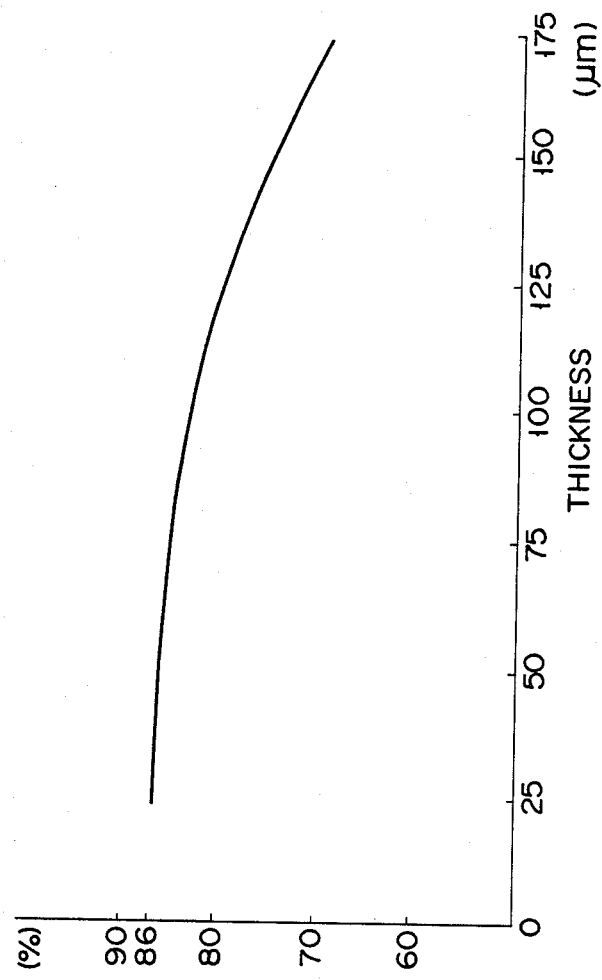
FIG. 13 is a graph showing the relationship between the thickness of a reflector body and an infrared transmittance.

In the illumination apparatus, infrared rays transmitted through multilayered optical film 5 are not absorbed by body 4 upon transmission therethrough. When a high-output discharging lamp is used as light source 1, as described above, body 4 can be prevented from being degraded by heat. More specifically, the polyimide-based resin and the polyether ketone-based resin have a relatively high transmittance of light components in the infrared wavelength range. Therefore, reflector body 4 is formed of these resin materials, infrared absorption in the body can be suppressed, and a temperature rise of the body can be prevented. If the thickness of body 4 is increased, an absorbance upon transmission of infrared rays is inevitably increased. FIG. 13 shows the characteristics. However, if the thickness of body 4 is decreased, the infrared absorbance is decreased, and temperature of body 4 can be decreased. The above-mentioned synthetic resin materials have high heat resistance, and are advantageous from this point of view. Conditions in that the temperature of body 4 does not exceed a heat-resistant temperature of the material were examined in consideration of the relationship between an output of a light source and an area of a reflector in a conventionally designed illumination apparatus. As a result, it was found that if the thickness of body was 300 $\mu$m or less, the temperature of body 4 became lower than the heat-resistant temperature of the synthetic resin material. However, if body 4 has a very small thickness, the mechanical strength becomes insufficient, and in particular, precision of the reflection surface is degraded. In practical applications, the thickness can be 50 $\mu$m or more to obtain a sufficient mechanical strength and satisfactory precision of the reflection surface.

Body 4 of reflector 2 has a relatively small thickness. Thus, a film or sheet of the synthetic resin material within the above thickness range can be fabricated to manufacture a reflector body of a predetermined shape, thus decreasing manufacturing cost.

Figure 3:
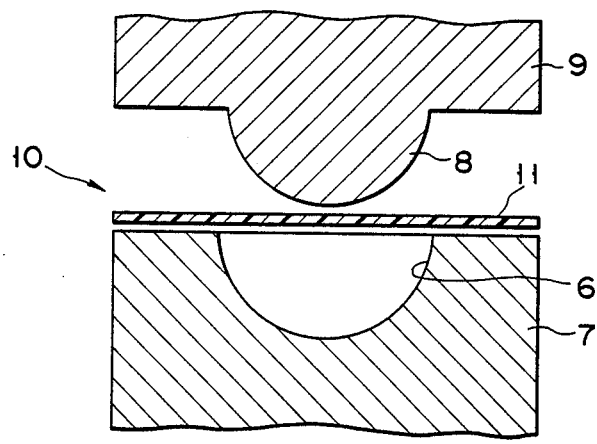
FIG. 3 is a schematic view of a method of manufacturing the reflector.

As shown in FIG. 3, film or sheet 11 of the resin material is heated and pressed between lower mold 7 having recess 6 and upper mold 9 having projection 8, thus manufacturing a reflector body of a desired shape. A multilayered optical film is deposited on the inner surface of the body by a method such as vacuum deposition.

FIG. 4 shows another molding method. In this method, lower mold 12 having suction path 14 is used. The interior of the recess is evacuated through suction path 14 while edge portions of film or sheet 11 are urged by metal press members 13, and the film or sheet is molded into a desired shape by the negative pressure.

FIG. 5 shows still another molding method. In this method, film or sheet 11 is sandwiched between lower mold 17 having recess 6 and upper mold 15 having compression path 16, and compressed air is supplied through compression path 16, so that the film or sheet is molded into a predetermined shape by the pressure.

FIG. 6 shows still another molding method. In this method, lower mold 12 shown in FIG. 4 and upper mold 15 shown in FIG. 5 are combined, and the film or sheet is molded by both the negative and positive pressures.

Figure 7:
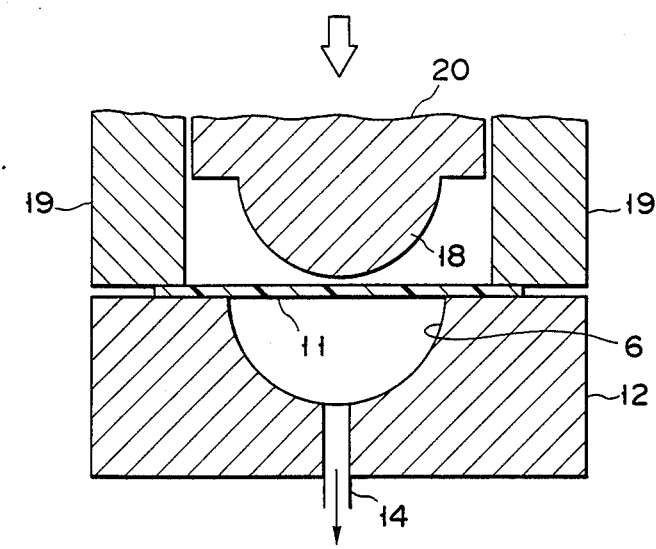
FIG. 7 is a schematic view showing still another method of manufacturing the reflector.

FIG. 7 shows still another molding method. In this method, lower mold 12 shown in FIG. 4 is used. Film or sheet 11 is placed on lower mold 12, and the edge portions thereof are urged by metal press members 19. Then, film or sheet 11 is pressed from above by upper mold 20 having projection 18. In this method, the film or sheet is molded by the negative pressure and a mechanical pressing force.

The above-mentioned molding methods can be appropriately selected in accordance with the thickness of the film or sheet or a shape of a reflector to be molded.

Figure 8:
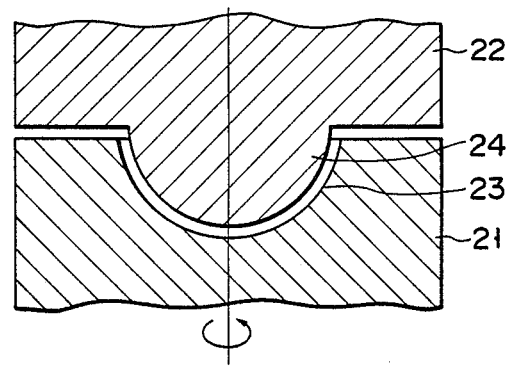
FIG. 8 is a schematic view showing still another method of manufacturing the reflector.
Figure 9:
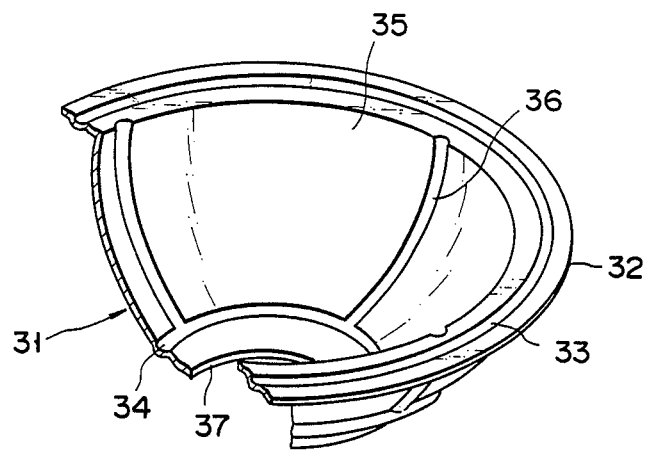
FIG. 9 is a perspective view showing a reflector of an illumination apparatus according to a second embodiment of the present invention.
Figure 10:
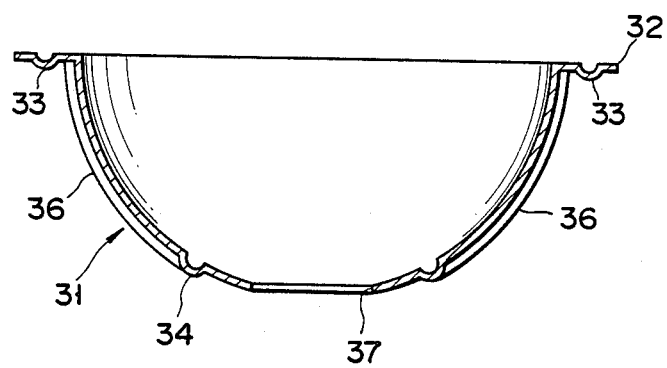
FIG. 10 is a sectional view of the reflector shown in FIG. 9.
Figure 11:
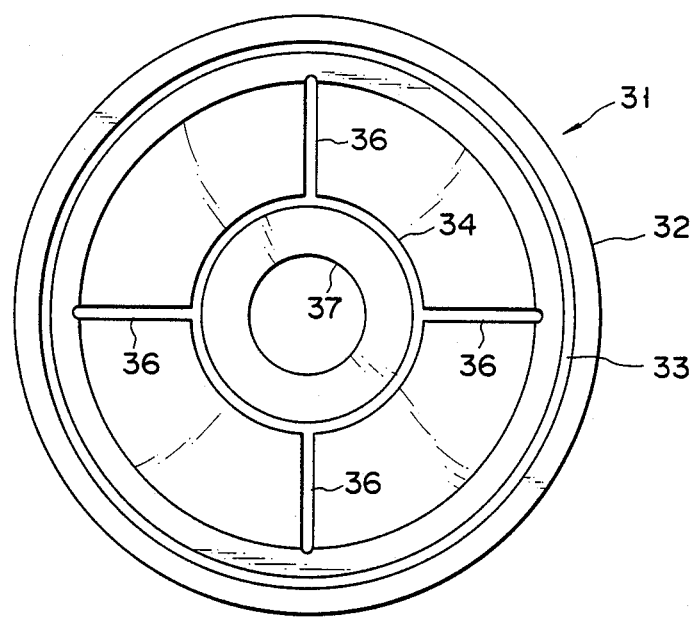
FIG. 11 is a front view of the reflector shown in FIG. 9.

In the fabrication method of the film or sheet described above, if fabrication is not easy, a reflector body may be manufactured by an injection molding method shown in FIG. 8. In this method, rotary lower mold 21 having recess 23 and upper mold 22 having projection 24 are used. A non-hardened resin material is injected between recess 23 of lower mold 21 and projection 24 of upper mold 22, and the resin material is hardened while rotary lower mold 21 is rotated. With this method, a reflector body having a complicated shape can be manufactured, and the thickness of the body can be locally changed.

Figure 12:
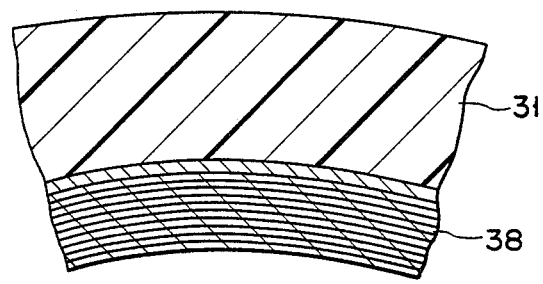
FIG. 12 is a partially enlarged sectional view of the reflector shown in FIG. 9.

FIGS. 9 to 12 show a second embodiment of the present invention. In this embodiment, a plurality of rib portions are formed on the reflector to reinforce the reflector. More specifically, annular rib portion 34 is formed around lamp insertion hole 37. Four rib portions 36 are radially formed from rib portion 34. In addition, annular rib 33 is formed on flange portion 32. Multilayered optical film 38 is deposited on the inner surface of body 31 of the reflector of the above shape, as shown in FIG. 12. The reflector body is reinforced by the rib portions to increase the mechanical strength and to maintain high precision of the reflection surface. Note that some light components are scattered by these rib portions. However, these rib portions have a small width, and do not affect the overall optical characteristics. The diffusion of light, achieved by these rib portions, can be utilized to give the reflector a desired light-distributing characteristic. The rib portions can be formed integrally with the reflector body by using a mold having projections or depressions.

The above embodiments are exemplified for easy understanding of the present invention. Therefore, the present invention is not limited to the above embodiments, and various other changes and modifications may be made within the spirit and scope of the invention by those who are skilled in the art.

What is claimed is:

1. A reflector for reflecting light emitted from a light source, comprising:
   a body made of a material selected from the group consisting of a polyimide-based resin and a polyether ketone-based resin, and having a thickness falling within a range of 50 $\mu$m to 300 $\mu$m; and;
   a reflection film deposited on said body to allow infrared rays to pass and reflect visible light, said film formed by alternately stacking a plurality of layers having high refractive indeces and a plurality of layers having low refractive indeces.

2. A reflector according to claim 1, wherein said body is made from a sheet and has rib portions.

* * * * *